(12) United States Patent
Heintzmann et al.

(10) Patent No.: US 7,450,238 B2
(45) Date of Patent: Nov. 11, 2008

(54) DEVICE AND METHOD FOR SPECTRALLY RESOLVING DETECTION OF A SAMPLE

(75) Inventors: Walther Rainer Heintzmann, Goettingen (DE); Allen Keith Lidke, Goettingen (DE); Michael Thomas Jovin, Goettingen (DE)

(73) Assignee: Max-Planck-Gesellschaft zur Foerderung der Wissenschaften E.V., Munich (DE)

( * ) Notice: Subject to any disclaimer, the term of this patent is extended or adjusted under 35 U.S.C. 154(b) by 332 days.

(21) Appl. No.: 10/544,043

(22) PCT Filed: Jan. 26, 2004

(86) PCT No.: PCT/EP2004/000608

§ 371 (c)(1),
(2), (4) Date: Jun. 26, 2006

(87) PCT Pub. No.: WO2004/068091

PCT Pub. Date: Aug. 12, 2004

(65) Prior Publication Data

US 2006/0290938 A1    Dec. 28, 2006

(30) Foreign Application Priority Data

Jan. 29, 2003    (EP) .................................. 03002038

(51) Int. Cl.
*G01B 9/02* (2006.01)
*G01J 3/45* (2006.01)
(52) U.S. Cl. ..................................................... 356/451
(58) Field of Classification Search ......... 356/451–456; 250/339.07–339.09
See application file for complete search history.

(56) References Cited

U.S. PATENT DOCUMENTS

| 5,565,986 | A  | * | 10/1996 | Knuttel ......................... 356/456 |
| 7,333,207 | B2 | * | 2/2008 | Bewersdorf et al. ......... 356/451 |
| 2005/0018201 | A1 | * | 1/2005 | de Boer et al. .............. 356/479 |
| 2007/0086018 | A1 | * | 4/2007 | Shih et al. ................... 356/451 |

(Continued)

*Primary Examiner*—Patrick J Connolly
(74) *Attorney, Agent, or Firm*—Stephan A. Pendorf; Patent Central LLC

(57) ABSTRACT

Disclosed are an array and a method for the spectrally resolving detection of a sample (22) that is illuminated by means of an illuminating radiation (12) by detecting a sample radiation (24) emitted by the sample (22). Said array comprises an illuminating beam path via which illuminating radiation (12) can be delivered to the sample (22) from a lighting source (10, 10'), and an observation beam path via which sample radiation (24) can be delivered to a detector (40) an observation radiation. An interferometer (30) that is disposed in a section of the observation beam path, which does not comprise the sample (22), splits incident input inteferometer radiation into two portions by means of an interferometer beam splitter, directs said two radiation portions via two paths which are provided with radiation-guiding means (34, 36) and whose effective path length difference can be modified, and superimposes the two radiation portions in a mutually interfering manner so as to form an interferometer output radiation such that the spectral distribution of the observation radiation (24) impinging at a specific point of the detector (40) can be modified by modifying the effective path length difference. The interferometer (30) is arranged in a beam path section that is common to the illuminating beam path and the observation beam path such that the effective path length difference in the illuminating beam path changes when the effective path length difference is modified in the observation beam path.

20 Claims, 4 Drawing Sheets

U.S. PATENT DOCUMENTS

2007/0127033 A1* 6/2007 Ueno .................... 356/456
2007/0165234 A1* 7/2007 Podoleanu ............. 356/451
2008/0088849 A1* 4/2008 De Lega et al. ........ 356/450

* cited by examiner

DEVICE AND METHOD FOR SPECTRALLY RESOLVING DETECTION OF A SAMPLE

CROSS REFERENCE TO RELATED APPLICATION

This application is a national stage of PCT/EP2004/000608 filed Jan. 26, 2004 and based upon EP 030002038.2 filed Jan. 29, 2003 under the International Convention.

BACKGROUND OF THE INVENTION

1. Field of the Invention

The invention concerns an arrangement for the spectrally resolving detection of a sample, wherein the sample is illuminated by an illuminating radiation and wherein sample radiation emitted by the sample is detected, the arrangement comprising an illuminating beam path via which illuminating radiation can be delivered to the sample from an lighting source, and an observation beam path via which sample radiation can be delivered to a detector as observation radiation, wherein an interferometer, disposed in a section of the observation beam path which does not include the sample, splits incident interferometer input radiation into two portions by means of an interferometer beam splitter, directs the two radiation portions along two paths which are provided with radiation-guiding means and whose effective path length difference can be modified, and superimposes the two radiation portions in an mutually interfering manner so as to form an interferometer output radiation such that the spectral distribution of the observation radiation impinging at a specific point of the detector can be varied by varying the effective path length difference.

The invention further concerns a process for the spectrally resolving detection of a sample that is illuminated by means of an illuminating radiation by detecting a sample radiation emitted by the sample, in which illuminating radiation is supplied to the sample from a lighting source along an illuminating beam path, and sample radiation is provided to a detector as observation radiation along an observation beam path, wherein observation radiation passes through an interferometer that is disposed in a section of the observation beam path which does not comprise the sample, in which interferometer the observation radiation as incident interferometer input radiation is split into two radiation portions by means of an interferometer beam splitter, the two radiation portions are directed along two paths whose effective path length difference can be varied, and the two radiation portions are superimposed in a mutually interfering manner to form an interferometer output radiation, wherein sequentially a number of measurement data are recorded with various settings of the effective path length difference, so that the spectral distribution of the observation radiation impinging at one specific point of the detector is different for different measurements.

2. Description of Related Art

A device of this generic type and a process of this generic type are known from EP 0767361 A2. There is described an imaging spectrometer for the spectral analysis of light emitted from a sample. An interferometer is provided in the observation radiation beam path of a known spectrometer, in which interferometer light from one point in a focal plane of the sample is coupled-in as a parallel ray bundle with a particular angle of incidence. The input beam is split into two partial beams by means of a semi-transmissive (half-slivered) mirror functioning as a beam splitter. The partial beams follow different paths in the interferometer and are reunited at the outlet of the interferometer in a manner mutually interfering with each other. The reunited beam is imaged upon the sensitive surface of an image-generating detector. The paths, through which the two partial beams pass in the interferometer, exhibit relative to each other an optical (or more generally: an effective) path length difference (OPD: optical path difference). In the known array the optical path length difference corresponds substantially to the geometric path length difference. The OPD in the known interferometer is variable by changing the geometric light path. In equivalent manner, the index of refraction in the area of the light path could be varied.

For carrying out a spectral analysis, multiple recordings are made with a detector, wherein the OPD set in the interferometer is varied between the individual recordings. This has the consequence, that depending upon adjustment of the OPD certain spectral components of the observation radiation are amplified or, as the case may be, attenuated or cancelled by interference. The spectral distribution of the observation light impinging at one point of the detector is thus not only dependent upon the spectral distribution of the light emitted by the sample, but rather also by the respective adjusted OPD. Note, that the OPDs for different detector points, as a rule, are different. Each individual detector point can also be considered, independent from the remaining detector points, as a one channel single detector.

The result of a measurement of this type is a sequence of intensity measurement units as a function of the interferometer settings. The term "measurement units" refers in the one dimensional case to a single measurement value and signifies, in the case of an imaging spectrometer, a recorded individual image. The recorded sequence of intensity measurement units corresponds in the imaging case to an "image stack", in which the same respective pixels along the axis of interferometer settings parameters (for example, an adjustment angle) correspond to each other and can be considered as unidimensional measurements of the corresponding sample point.

SUMMARY OF THE INVENTION

One such stack of images can be pixel-wise converted, for example by application of a Fourier transform, into a spectrum, which represents the spectral distribution of the light emitted from the corresponding point of the sample. The product has the form of a sequence of spectral data units. The term "data unit" refers analogously to the above discussed "measurement unit" in the unidimensional case to an individual calculated data value, and signifies, in the case of an imaging spectrometer, a calculated individual image. The calculated sequence of spectral data units corresponds, in the imaging case, to a second image stack, in which pixels of the same respective position in the individual image along the spectral axis correspond to each other. This type of pixel sequence can be viewed as independent, unidimensional spectra of the corresponding sample points. In place of a Fourier transform, other spectrum producing mathematical operations can basically also be applied.

The fundamental principles are known to the person of ordinary skill in the field of Fourier-spectroscopy. Thus, in the conventional Fourier-spectroscopy, the intensity $I_{det}(OPD_{em})$ detected in one point of the detector depends as follows on the spectral intensities $I_{em}(k_{em})$ emitted from the sample:

$$I_{det}(OPD_{em}) = \int_0^\infty \epsilon_{em}(k_{em}, OPD_{em}) I_{em}(k_{em}) dk_{em} \quad (1)$$

Therein, $k_{em} = 2\pi/\lambda_{em}$ is the wave number, wherein $\lambda_{em}$ is the wavelength of the sample radiation. The expression $\epsilon_{em}(k, OPD_{em})$ describes the effect of the interferometer and can be approximated as:

$$\epsilon_{em}(k_{em}, OPD_{em}) = 91 + m_{em} \cos(k_{em}, OPD_{em}))/2 \quad (2)$$

Therein $m_{em}$ is the degree of modulation of the interference pattern, which, due to for example equipment deficiencies, such as a beam splitter which does not precisely divide in half, could be smaller than one. The index "em" in OPD indicates that it concerns that OPD which lies between the portions of the observation radiation interfering with each other.

The result of the spectrum producing mathematic operation, in particular the Fourier transform, provides the sought after spectral distribution $I_{em}(k_{em})$.

The known processes using the known devices exhibit, in particular in imaging applications with small beam intensities, such as for example with the imaging evaluation of emission spectra in fluorescence microscopy, great advantages. It is however not possible therewith to determine information regarding the excitation spectrum, that is, the spectral distribution of the extend in which illuminating radiation can interact with the sample, for example be absorbed. This is however, besides the emission spectrum of the material, a substantial material characteristic, which can be drawn upon for characterization of a sample or, as the case may be, for identification of certain components of a sample.

With the known spectrometer, this type of information is, for example in the case of a fluorescence measurement, obtainable only by application of the following known process: First the spectral distribution of the illuminating radiation is reduced as strongly as possible, that is, the sample is illuminated by an extremely narrow-band light, as is obtainable for example by an appropriate band pass filter or by use of narrow band laser. If the illuminating radiation lies at least partially in the area of the excitation spectrum, then the sample is accordingly excited to fluoresce. Thereupon, as described above, a sequence of recordings is carried out with various settings of the optical path length difference in the interferometer and the above described calculations are employed, that is, an emission spectrum is recorded. Subsequently the same measurement and calculation is repeated with different, likewise very narrow-band, spectral distribution of the illuminating radiation. This process is repeated so often until the entire spectrum of the illuminating radiation of interest is run through. A comparison of the emission spectrum associated with the varying illuminating wavelengths and intensities provides then the searched-for excitation spectrum. A disadvantage of this process is a substantial investment in time, which at the same time is associated with a strong radiation exposure of the sample. In particular, with the known device sensitive biological samples are thus analyzable only with difficulty. Also, changes of the sample with time, as they are of interest particularly in the field of biology, are not ascertainable with the known process and the known device.

It is thus an object of the present invention to further improve a spectrometer of the generic type, so that information regarding the excitation as well as the emission spectrum of the sample can be obtained with reduced radiation exposure and shorter measurement times.

It is a further object of the present invention to further develop a measuring process of the generic type, such that information regarding both the excitation as well as the emission spectrum of the sample can be obtained with reduced radiation exposure and shorter measurement times.

The first mentioned task is solved, in conjunction with the elements set forth in the precharacterizing portion of Patent claim 1, thereby that the interferometer is provided in the path of radiation travel common to the illuminating radiation path and the observation radiation path, so that by the change of the effective wavelength differential in the observation radiation path, also the effective wavelength differential in the illuminating radiation path also changes.

The second mentioned task is solved in conjunction with the characteristics of the precharacterizing portion of claim 7 thereby, that illuminating radiation also passes through the same interferometer, so that by the change of the effective wavelength differential in the observation beam path, also the effective wavelength differential in the illuminating beam path also changes.

To avoid unnecessary repetition, the inventive spectrometer as well as the inventive process will be discussed together in the following.

It is the basic idea of the invention, that the interferometer is passed through by both the illuminating radiation as well as the observation radiation, wherein due to the change of the effective path length difference both the illuminating radiation as well as the observation radiation experience a splitting and subsequent reunification for formation of an interference pattern, as described above. This approach seems surprising, since the simultaneous change of multiple process parameters, mainly the spectral distribution of illuminating and the observation radiation, seems to be contrary to the analyzing detection of the emission and excitation spectrum of the sample. It is completely contrary to the above described conventional approach. Surprisingly it has however been found that in the case of appropriate analysis, which will be discussed in greater detail in the following, it allows very capably the detection of the information of interest with regard to the excitation spectrum and the emission spectrum of a sample.

In the inventive spectrometer, the spectral distribution of the observation radiation and the spectral distribution of the illuminating radiation change simultaneously. This occurs, in accordance with the invention, not, or not only, as a consequence of the sample's response changing due to the changed illumination, but rather (at least also) in the sense of a changed "filter effect", since the influence of the interferometer on the observation radiation is changed by changing the effective path length difference. This means, that the spectral distribution of the illuminating radiation $I_{ex}(k_{ex}, OPD_{ex})$ in one point of the sample can be described as:

$$I_{ex}(k_{ex}, OPD_{ex}) = \epsilon_{ex}(k_{ex}, OPD_{ex})I_{LS}(k_{ex}) \quad (3)$$

wherein $k_{ex} = 2\pi/\lambda_{ex}$ is the wave number with $\lambda_{ex}$ the wavelength of the illuminating radiation and $I_{LS}$ is the intensity of the lighting source. The index "e" in OPD indicates that this refers to that OPD, which lies between the portions of the illuminating radiation mutually interfering with each other, $\epsilon_{ex}$, the effect of the interferometer on the illuminating radiation, can be described analogously to $\epsilon_{em}$ in equation (2), namely as $$\epsilon_{ex}(k_{ex}, OPD_{ex}) = (1 + m_{ex}\cos(k_{ex}, OPD_{ex}))/2 \quad (4)$$

If one then starts with the reasonable assumption, that the excitation spectrum $S_{ex}(k_{ex}, OPD_{ex})$ is independent upon the emission spectrum $S_{em}(k_{em}, OPD_{em})$, then the spectral intensity emitted from the sample can be described as $$I_{em}(k_{em}, OPD_{em}) = S_{em}(k_{em}, OPD_{em})\rho \int_0^\infty S_{ex}(k_{ex}, OPD_{ex})I_{ex}(k_{ex}, OPD_{ex})dk_{ex} \quad (5)$$

where $\rho$ can be for example the fluorophore concentration of the sample. The index em in OPD indicates that this concerns that type of OPD which lies between the portions of the sample radiation mutually interfering with each other. One must bear in mind, that the excitation spectrum $S_{ex}$ may not be confused with the spectral distribution of the illuminating radiation. Rather $S_{ex}$ concerns the spectral distribution of the extend of the possible interaction (for example caused by absorption) between the sample and various wavelengths of the illuminating radiation and is independent from the illuminating intensity.

Insertion of equation (5) in equation (1) provides the demonstrative formula for the observation radiation of the inventive spectrometer:

$$I_{det} = \int_0^\infty \varepsilon_{em}(k_{em}, OPD_{em}) I_{em}(k_{em}, OPD_{em}) dk_{em} \quad (6)$$

$$= \rho \int_0^\infty \int_0^\infty \left[ \begin{array}{c} \varepsilon_{em}(k_{em}, OPD_{em}) S_{em}(k_{em}, OPD_{em}) \times \\ S_{ex}(k_{ex}, OPD_{ex}) I_{ex}(k_{ex}, OPD_{ex}) \end{array} \right] dk_{ex} dk_{em}$$

$$= \rho \int_0^\infty \varepsilon_{em}(k_{em}, OPD_{em}) S_{em}(k_{em}, OPD_{em}) dk_{em} \times$$

$$\int_0^\infty \varepsilon_{ex}(k_{ex}, OPD_{ex}) S_{ex}(k_{ex}, OPD_{ex}) I_{LS}(k_{ex}) dk_{ex}$$

It is an important insight of the invention, that the information contained in such a signal regarding the excitation spectrum and the emission spectrum of the sample can be reconstructed independently, so that the prior art processes with separate measurement and separate spectral analysis of the observation radiation for varying illuminating wavelengths can be substantially simplified and be reduced to the measurement of a single sequence of intensity measurement data or units with varying OPDs. Application of, for example, a Fourier transform on the product of equation (6) leads namely to $$FT(I_{det}(OPD)) = \rho[a\delta(k) + (m_{em}/2)S_{em}(k) + (m_{em}/2)S_{em}(-k)] \otimes [ \quad (7)$$
$$b\delta(k) + (m_{ex}/2)S_{ex}(k)I_{LS}(k) + (m_{ex}/2)S_{ex}(-k)I_{LS}(-k)]$$

$$a = \int_0^\infty S_{em}(k_{em}) dk_{em};$$

$$b = \int_0^\infty S_{ex}(k_{ex}) I_{LS}(k_{ex}) dk_{ex}$$

$\delta(k)$: Three-axis Delta-Distribution

For further analysis it is advantageous, however not necessary, to calculate the real part of the absolute value of the complex Fourier transform and to use this as basis for further processes. It is however expressly pointed out, that in principle other spectrum producing mathematical operations can also be employed.

The two terms of equation (7) can be described for illustration. For purposes of explanation a simplified emission spectrum $S_{em}$ is assumed, which exhibits a constant value in a contiguous wavelength range and otherwise is zero. One such spectrum is represented in general in FIG. 3*a* as S (λ). The first term of equation (7) is then represented by FIG. 3*b*. The Delta-peak at k=0 results from the signal's constant component which, due to the fact that the intensity of the modulated emission radiation cannot be negative, is unavoidable. The emission spectrum presents itself symmetric or k=0. The mirror symmetry becomes understandable with the complex exponential representation of the cosine function in equation (2).

In similar manner the second term of equation (7) can be represented. Here, likewise for purposes of explanation, a simplified excitation spectrum $S_{ex}$ is assumed, which exhibits a constant value in a contiguous wavelength region and otherwise is zero. Here FIG. 3 can also serve for illustration, which however should be understood purely schematically (as a rule, in comparison to the emission spectrum, a displacement (the so-called Stokes' shift) is to be assumed). The second term of equation (7) can also be illustrated by a constant component (Delta-Peak at k=0) and mirror-symmetric excitation spectrum $S_{ex}$ (FIG. 3*b*).

The convolution described in equation (7) of the simplified spectra of FIG. 3, can be illustrated on the basis of FIG. 4. FIG. 4*a* illustrates the excitation and the emission spectra $S_{ex}$ and $S_{em}$. The excitation spectrum is, relative to or in comparison to the emission spectrum, displaced in not overlapping manner towards the short wavelength radiation range. This assumption, which however is no precondition for the invention, is realistic for example in the field of fluorescence spectroscopy (Stokes' shift). The resulting spectrum shown in FIG. 4*b* corresponds in strongly simplified form to the resulting spectrum determined by means of the above described inventive process. It is comprised of the combination of:

a) a Delta-Peak at k=0 (convolution of the individual Delta-Peaks)
b) the mirror symmetric spectra $S_{ex}$ and $S_{em}$ (convolution of $S_{ex}$ or as the case may be $S_{em}$ with the Delta-Peak of the respective other terms of equation 7).
c) a central differential spectrum about k=0 represented as triangle, which results from the convolutions of the respective mirror symmetric components of $S_{ex}$ and $S_{em}$, and
d) two mirror-symmetric summation spectra, likewise represented as triangle, which result from the convolution of $S_{ex}$ with $S_{em}$.

Depending upon the intent of the experimenter, the resulting spectrum shown in FIG. 4 can be further employed with the aid of a priori known, supplemental information concerning the design or configuration of the apparatus.

In one advantageous embodiment of the inventive process in which a fluorescing, that is, fluorophore containing, sample is employed, it is advantageous to substantially separate from each other, using a suitable filters and/or color dividing mirrors, the possible spectral distributions of the illuminating and the observation light, and to adapt these to the expected excitation and emission spectrum of the sample. With such a priori knowledge of the possible spectral distributions of illuminating radiation and/or observation radiation the resulting sequence of spectral data units (see for example FIG. 4) can be segmented in different spectral data segments along the spectral axis. In imaging applications the segmentation along the spectrum image stack can be undertaken differently for different pixels. One segmentation of this type can lead directly to the desired excitation and emission spectrum. This data can for example be compared with the stored reference values, which can enable an identification of the fluorophore species present in the corresponding point of the sample.

Note, that the above explained calculation or evaluation of spectral data units is advantageous in certain cases, but however is not necessary for the invention, since the total information content is already contained in the "raw data" recorded according to the invention, that is, in the recorded sequence of intensity measurement units. Thus it is possible, for example by application of a process known as "linear unmixing", which essentially includes the setting up and calculation of a linear system of equations with use of stored data, which possibly characterizes components contained in the sample, to calculate or evaluate the composition of the sample, in particular concentrations of individual components, from the raw data. With simple applications it is possible also to compare multiple intensity measurement units and/or relationships of intensity measurement units with stored data, in order to reveal evidence regarding the sample or as the case may be sample components (for example, classification). This variant is particularly useful for time-critical applications, in which within a short period of time only few measurement units can be recorded and in which the evaluation time must be kept as short as possible.

A different way to utilize the acquired sequence of spectral data units is to use one spectral data unit or a partial sequence of spectral data units from a data segment solely attributable to the illuminating radiation, in particular the excitation spectrum, for representation of an object plane of interest of the sample. This application is based upon a particular advantage of the inventive process and the inventive device.

The modulation depth $m_{ex}$ of the interference pattern of the illuminating radiation in the sample produced by the interference in the illuminating beam path varies in the direction of the incident radiation depending on the particular selection of the radiation-guiding means (for example lenses, mirrors, beam splitter, etc.). In particular, the modulation depth in the focal plane of the sample is particularly high. Outside of this focal plane the modulation depth of the interference pattern rapidly decreases. Since the total intensity of the illuminating radiation remains essentially the same, this condition expresses itself in equation (7) therein, that in the second term of equation (7) the Delta-Peak increases at k=0 outside of the focal plane to the detriment of the remaining addends. This means that light which contributes to the makeup of the second and third addends in the second term of equation (7), that is, to the mirror image representation of the excitation spectrum in the outcome sequence of spectral data units, is derived essentially only from the focal plane. Light from outside the focal plane contributes in comparison more strongly to the Delta-Peak at k=0. With the aid of the inventive process and the inventive array it is thus possible to obtain an optical cross-sectional image through the sample, which is otherwise known essentially to involve very complex technologies, such as for example confocal laser scanning applications. In addition to the spectral information one can also, on the basis of the present invention, obtain a clearly improved spatial resolution, for example in the case of microscopic applications.

A comparable application of spectral segmentation for producing optically segmented data from regions of the emission spectrum is not easily possible, since the modulation depth $m_{em}$ of the observation radiation is not dependent upon a position in the sample. It is however possible to process a first spectral data unit or a sequence of first spectral data units from a spectral data segment exclusively attributable to the illuminating radiation, in particular the excitation spectrum, together with a second spectral data unit or a sequence of second spectral data units from a spectral data segment exclusively attributable to the observation radiation, in particular the emission spectrum, in such a manner that the spectral data unit thus calculated serves for representation of the object plane in interest in the sample. In an imaging spectrometer the knowledge of the relationships described in equation (7) can be utilized for a detailed deconvolution. In simple applications the spatial information from an optically segmented image from the domain of the excitation spectrum can also be employed, in order to mask an image from the area of the emission spectrum. Therein it is to be noted that this does not represent an optical cross-sectioning in the actual sense, since in the simple masking without suitable deconvolution components from planes outside of the focal plane also continue to contribute to the signal.

In similar manner, also segments of the resulting sequence of spectral data units, which are attributable to the illuminating radiation, in particular the excitation spectrum, as well as also the observation radiation, in particular the emission spectrum, that is, the summation and/or differential spectra, can be computationally combined with each other or with a segment of the resulting sequence of spectral data units solely attributable to the observation radiation, in particular the emission spectrum, by suitable deconvolution for production of optically cross-sectional data.

There are various approaches for the concrete designing of the inventive array. It is particularly advantageous if, depending upon the adjusted effective path length, the two paths along which [travel] the two radiation portions into which the interferometer splits an incident interferometer input radiation occurring as a parallel ray bundle, are identical or closely adjacent to each other, and are traveled through by the two radiation portions in opposite directions. This is the case for example in a Sagnac interferometer. The Sagnac interferometer has, in comparison to other types of interferometer, for example the Micheloson interferometer, the advantage of a compact and particularly robust manner of construction.

For changing the effective path length difference in a Sagnac interferometer, it is advantageous to pivot the entire interferometer about an axis perpendicular to the illuminating and observation beam path about an axis through the interferometer beam splitter. Thereby the geometric relationships between the individual components of the interferometer remain intact and unchanged.

Preferably radiation-guiding means are provided in the observation beam path and in the illuminating beam path, so that different points of a spatially limited luminous area of a virtual image field plane of the lighting source can be associated to different points of the sample and different points of the sample can be associated to different points of the detector. This makes possible in particular an imaging application of the inventive spectrometer. The luminous area in the virtual image field plane is conventionally an area equivalent to a homogenous lighting source, which is produced from a structured lighting source for example with the aid of lenses and/or irises, in order to prevent the imaging of lighting source structures onto the sample. The virtual image field plane can of course also coincide with a real plane of the lighting source, for example a homogenous luminous diffusing screen.

In the particularly preferred application of a Sagnac interferometer in combination with an imaging application it is to be noted, that different points are to be assigned to different effective path length difference. With pivoting of the interferometer there is thus in no case a uniform change in effective path length difference over the entire image, but rather the effective path length for each individual image point. Nevertheless, for simplification of the expression in the framework of this description reference will be made to a change in "the effective path length difference".

Preferably the luminous area of the lighting source is arranged offset relative to the axis of symmetry of the illuminating radiation path, so that radiation originating from a point of the luminous area and delivered to the associated point of the sample not as illuminating radiation but rather as radiation back-reflected from the interferometer, is radiated in a direction, which is different from the direction in which observation radiation originating emitted from the associated point in the sample is radiated as interferometer output radiation. In other words, radiation from the lighting source is obliquely coupled into the interferometer. This has the advantage, that the illuminating radiation, which is not directed onto the sample, but rather is reflected back from the interferometer beam splitter, does not reach the detector or at least does not reach this same area of the detector as the observation radiation. This would namely lead to undesired interference between illuminating and observation radiation on the detector, which could lead to a corruption of the measurement results. Besides this, due to the supplemental light the signal/noise relationship would be undesirably changed.

The displacement occurs preferably by an amount, which corresponds to approximately one-half of the dimension of the luminous area. In this manner the region of overlap between observation radiation and back-reflected illuminating radiation on the detector is minimized and at the same time the deviation from symmetry is kept small. The displacement can occur in such a manner that is a oblique incidence of the illuminating light occurs in a plane, in which the illuminating and the observation radiation beam path essentially run; preferably however the displacement also occurs, at least also, perpendicular to this plane. One similar effect can also be achieved by tilting the radiation-guiding means, in particular the mirror, in the interferometer.

One special embodiment of such an interferometer is characterized in that the radiation-guiding means of the interferometer comprises two mirrors, which are arranged at an angle of approximately 45 degrees relative to each other at the two corners delimiting the hypotenuse of an isosceles, right-angled triangle, in the third corner of which the interferometer beam splitter is provided. Of course also other angle arrangements can be selected, for example a 120 degree arrangement. The preferred embodiment has however the advantage, that it is adapted to the conventional beam guidance in fluorescence microscopes, so that an employment in this important field of application appears particularly simple.

Therein it is advantageous when the interferometer beam splitter is provided in the third corner and is oriented approximately along the bisector of the angle. It is even more advantageous if, as discussed above, the interferometer beam splitter is slightly tilted relative to the bisector of the angle. Adjustment of this tilting influences the rate of the OPD-change during pivoting of the interferometer.

BRIEF DESCRIPTION OF THE DRAWINGS

Further advantages of the invention can be seen from the following special description and the accompanying drawings, in which there is shown FIG. 1 schematically an inventive spectrometer for imaging fluorescence microscopic applications.

DETAILED DESCRIPTION OF THE INVENTION

Figure 2:
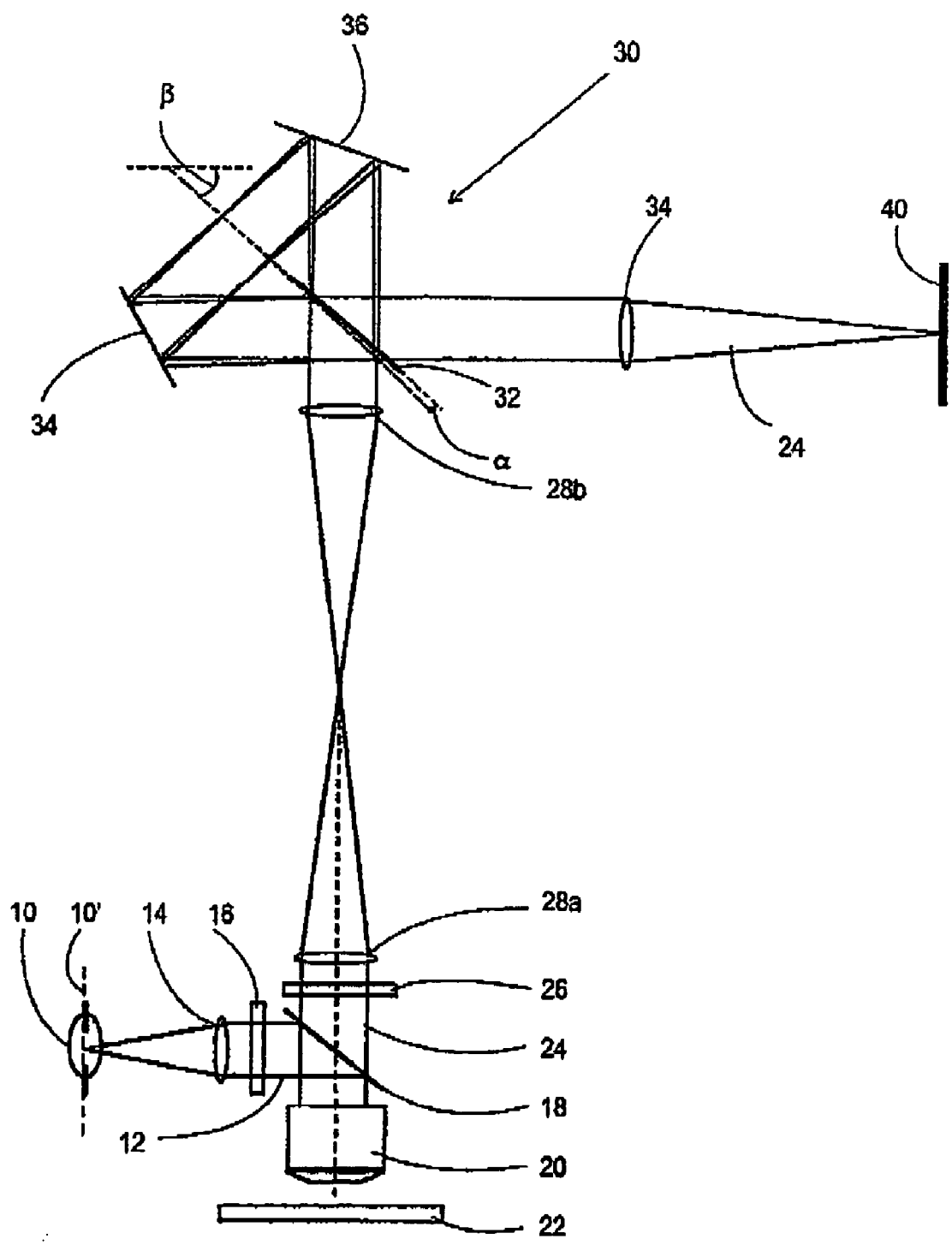
FIG. 2 schematically a spectrometer according to the state of the art for imaging fluorescence microscopic applications.
Figure 3:
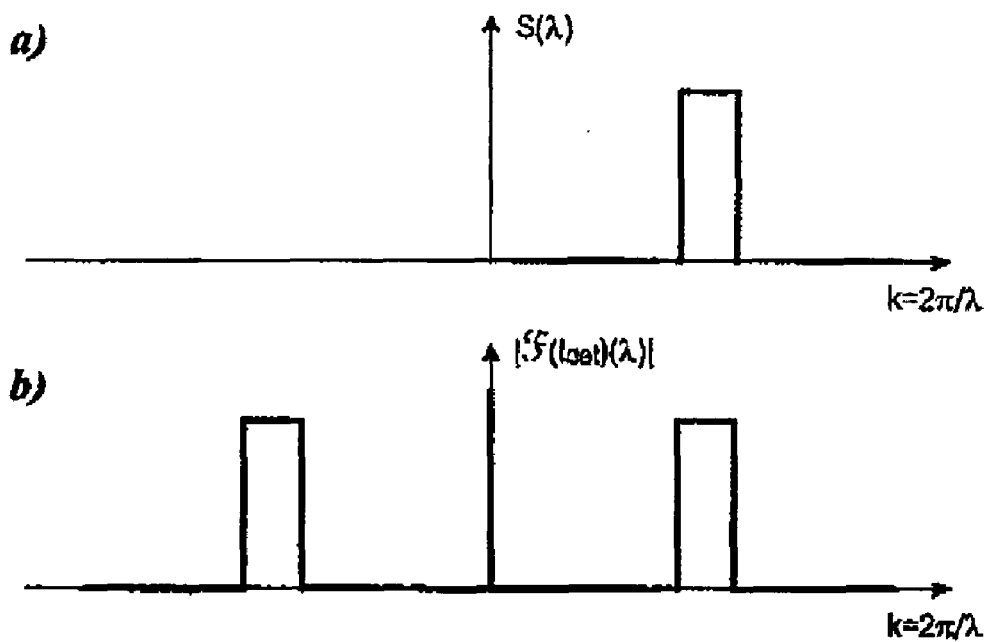
FIG. 3 simplified emission and excitation spectra as well as the illustration of the convolution product of equation (7), FIG. 4 simplified emission and excitation spectra as well as an illustration of the resulting convolution product of equation (7)
Figure 4:
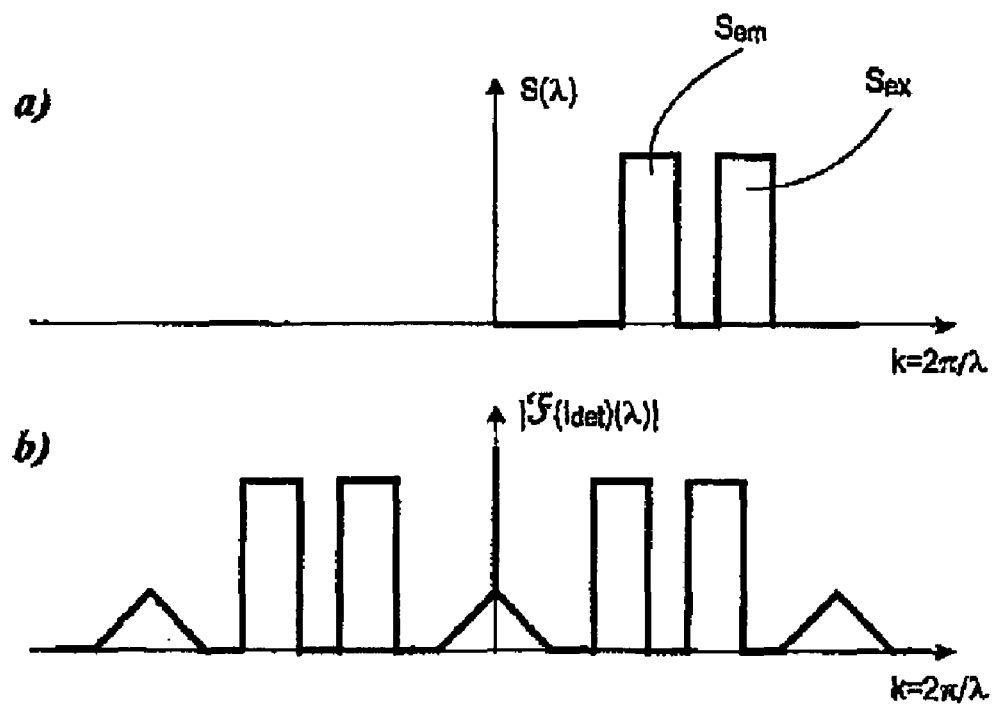

FIG. 2 shows schematically the design of a spectrometer according to the state of the art for imaging fluorescence microscopic applications. From a lighting source 10 the illuminating radiation 12 is coupled-in via a suitable beam widener 14, a short pass filter 16 and a color-dividing mirror 18 parallel into the rear aperture of a microscope lens 20, in order to illuminate a sample 22 lying in front of the front aperture of the microscope lens 20. The sample 22 is schematically shown in FIG. 2 as a microscope slide. Note, that the shown beam path is to be understood to be purely schematic. In particular as a rule no structures of the lighting source 10 but rather a virtual image field plane, indicated with reference number 10', is formed in the sample plane, in order to accomplish an even illumination there.

If the spectral distribution of the illuminating light overlaps the excitation spectrum of the fluorophores of the sample, then, by known fluorescence mechanisms, in the fluororphore an emission radiation is triggered of which the spectral distribution corresponds to the emission spectrum of the concerned fluorophore. The emission spectrum as a rule has, due to the so-called Stokes' displacement, a longer wavelength than the excitation spectrum. Emission light from a focal plane of the sample is parallelized by the microscope lens and can in the case of suitable selection of the color splitter 18 pass through this as well as through a subsequent long pass filter 26 as observation light. By means of an optional coupling lens shown schematically as two lenses 28A and 28B the observation radiation is coupled into a Sagnac interferometer 30. The Sagnac interferometer is comprised of a beam splitter 32 preferably in the form of a semi-transmissive or mirror or a beam splitting cube, which splits the entering light into two beam portions. A first beam portion is reflected at the beam splitter 32 onto a first mirror 34, from there further transmitted to a second mirror 36 and finally falls anew upon the beam splitter 32, wherein the here reflecting portion is imaged onto a surface detector 40, for example a CCD-camera, by means of an imaging lens 34.

A second portion of the light directed from the optional coupling in lens 28A, 28B onto the beam splitter is transmitted, falls then first on a second mirror 36, is reflected from this onto a first mirror 34 and reaches finally the beam splitter 32 again, where a portion of this light is transmitted and imaged on the surface detector 40 by means of the imaging lens 34.

The two beam components thus pass through essentially the same path in the interferometer, however in opposite directions. It is to be noted, that the exact same path is passed through only in the case of the exact symmetric orientation of the mirrors 34 and 36 and the beam splitter 32. Conventionally however the beam splitter 32 is slightly tilted by an angle $\alpha$ relative to the symmetry position. The two portions, into which the beam splitter 32 splits the incident observation radiation 24, thus interfere with each other and form on the detector 40 a corresponding interference pattern. For changing the OPD the total interferometer 30 is pivoted about the one axis through the beam splitter 32 (indicated by the angle $\beta$). The angle $\alpha$ has therein the function of a "biasing angle", which determines the rate of the OPD-change with change of the angle $\beta$. Recording multiple images, that is, multiple readings of the detector 40 with different settings of the angle $\beta$, leads to an image stack along an axis of interferometer adjustment parameter, in which the pixels of the individual images correspond to each other.

As already explained in the general portion of the description, a pixelwise Fourier transform over the image stack along the axis of interferometer setting parameter results in the desired emission spectrum.

Figure 1:
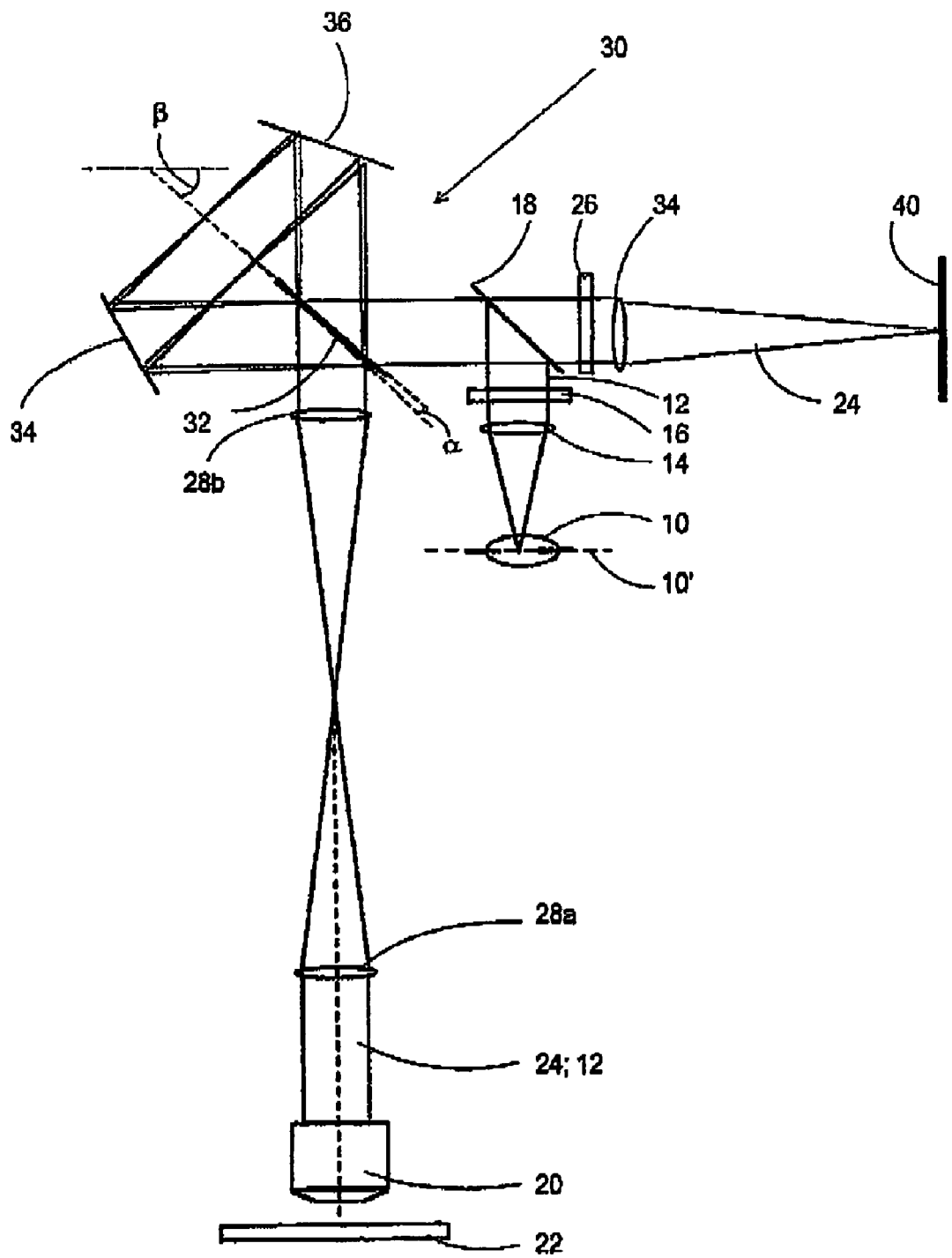

FIG. 1 shows the design of an inventive spectrometer for imaging fluorescence microscopic applications. Naming and illustration of the same individual components is identical for reasons of the easier comparison in FIG. 1 and FIG. 2. To avoid repetition, only the inventive differences will be discussed below.

The design or construction of the inventive spectrometer differs from the construction of the spectrometer according to the state of the art essentially by the arrangement of the lighting source 10, 10' and its coupling-in 14, 16, 18 into the system. This simple appearing variation is by no means trivial, but rather leads to important changes in the function of the spectrometer and provides, as already described above, substantial advantages in comparison to the state of the art.

The coupling in of the illuminating light 12 occurs "prior" to the interferometer 30. This means, that the interferometer 30 is provided in a beam path common to an illuminating beam path and the observation beam path.

Illuminating radiation, which is imaged by the microscope lens 20 in one point of the focal plane of the sample 22, impinges in the shown embodiment as a beam bundle parallelized by the lens 14 upon the beam splitter 32. Analogously to the above explained splitting and reuniting of the observation light in the case of the inventive spectrometer also the illuminating light is split in the interferometer 30 and is interferingly superimposed again. The sample 22 is thus illuminated with an OPD-dependent interference pattern, which is the focal plane exhibits a particularly large modulation depth, which decreases rapidly in the direction of the optical axis with increasing distance from the focal plane in the case of broadband illumination. With regard to the observation light there result no functional differences to the spectrometer according to the state of the art. The changed arrangement of the long pass filter 26 is a necessary consequence from the early coupling in of the illuminating light.

An important consequence of the new design of the beam paths in the inventive spectrometer is that by pivoting the interferometer 30 for variation of the OPD in the interferometer the illuminating light and the observation light are simultaneously affected. An independent variation of the light in one of the beam paths is not possible. This leads to the effect and advantage of the invention explained in the general part of the description.

Figure 5:
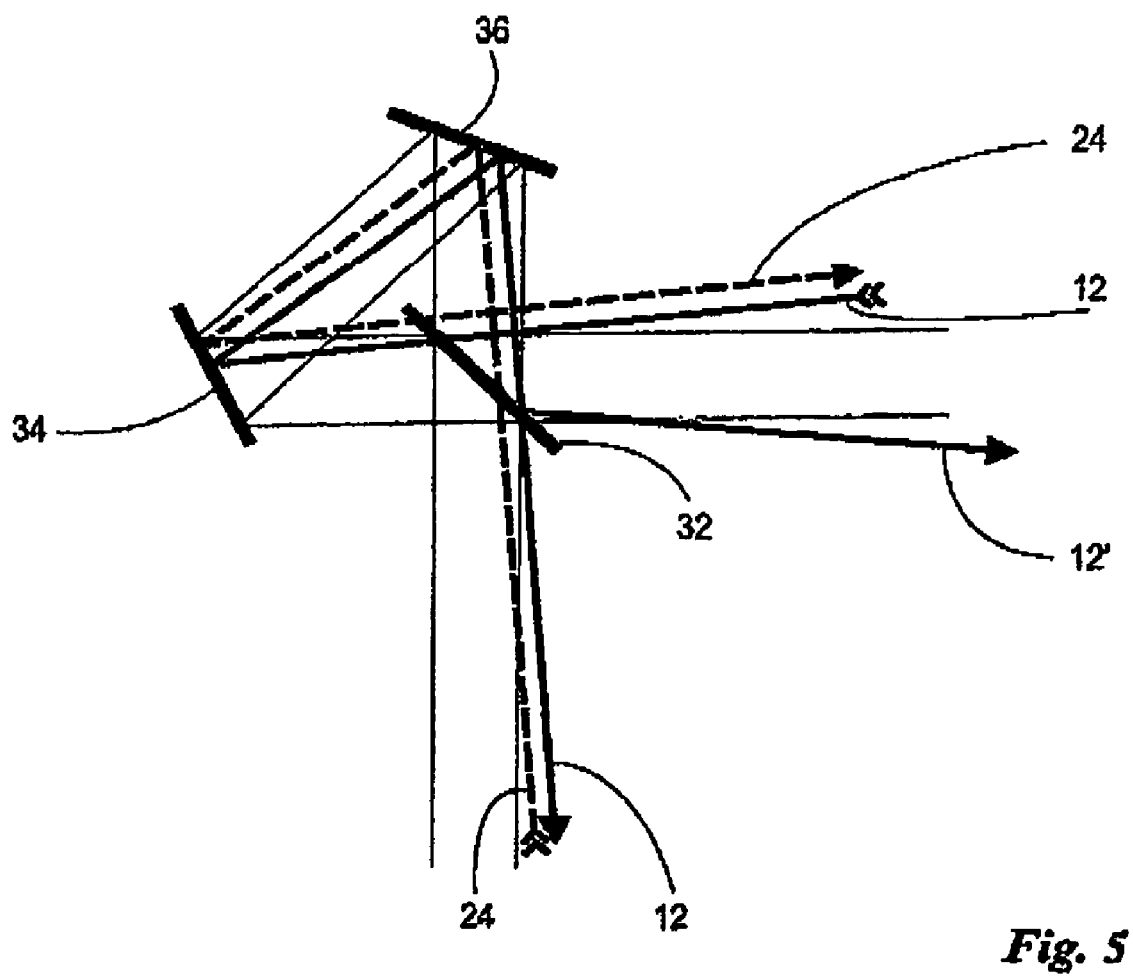
FIG. 5 schematically a selection of the beam path of the inventive spectrometer in the area of the interferometer.

FIG. 5 finally shows a schematic representation of the interferometer 30 of the inventive spectrometer in a particularly preferred design. This design is suitable for avoidance of overlapping of observation light with back-reflected illuminating light on the detector. In the common area of illuminating and observation beam path outside of the interferometer 30 observation light and illuminating light, which originate from one point of the focal plane in the sample or as the case may be illuminate this point, are guided anti-parallel. This applies also in the case of the embodiment of FIG. 5, which is shown with the arrows 12 and 24. Illuminating light 12, which passes through the interferometer, once again impinges at the interferometer beam splitter 32 at the interferometer outlet. There, due to the semi-transmissive character of the beam splitter 32, only a part of the light is transmitted and used for the actual illumination of the sample. A different part is reflected back at the beam splitter 32. With complete symmetrical coupling in of the light (indicated by the thin, continuous lines) this back-reflection would occur anti-parallel to the illuminating radiation 12 coupled into the interferometer 30 and thus to the observation radiation 24 coupled out from the interferometer. This would lead to an undesired superposition on the detector. A symmetric coupling-in is thus preferably to be avoided. Rather, the illuminating light, as shown in FIG. 12, is coupled-in obliquely, which can be realized by an eccentric displacement of the luminous area of the lighting source. By this deviation of the symmetric the back-reflected illuminating light 12' is deflected in a slightly different direction. Depending upon the size of the deviation from the symmetry it can in this manner be avoided, that the back-reflected illuminating light 12' reaches the detector at all. At least it falls essentially upon an area of the detector, in which the observation radiation of interest is not imaged. Note that in FIG. 5 only a obliqueness of incidence of the illuminating light in the plane of the paper can be shown, which corresponds to the plane in which the illuminating and the observation beam path essentially run. In an advantageous manner the oblique incidence of the illuminating light however occurs, at least also, perpendicular to the plane. Further aids such as shutters or irises, additional beam splitter, polarization filters, etc., can be employed in order to complete the separation of the radiation components. When using polarization filters there can in particular be employed a polarizer in combination with the filter 16 and an analyzer in combination with the filter 26.

Although the invention was described in detail in particular on the basis of imaging applications of fluorescence spectroscopy and in particular for fluorescence microscopic applications, its possible fields of application are in no way to be limited thereto. All explained principles are principally also applicable to one-dimensional, that is, non-imaging applications. The invention can also be applied to interaction types other than fluorescence, for example to diffusion or scatter, reflection, Raman spectroscopy, etc. Finally there is also no limitation to optical radiation. In the case of employment of the invention is non-optical regions there are appropriate adaptations to be undertaken with respect to the radiation-guiding means, which the respective person of ordinary skill in the art having before him the teachings disclosed herein would be obvious to him. Basically there is also no limitation to electromagnetic radiation. Rather the principles explained here could also be translated to areas of particle diffusion. With respect to the concrete technical embodiments the person of ordinary skill has a broad spectrum of modification possibilities at hand. Thus different detectors and types, such as for example CCD, CID, diode-arrays, quadrant anode photomultipliers, etc., could be employed. To the extent that reference is made in this description to pixels or image points in the framework of imaging applications, these are not intended or mean necessarily to be the smallest image unit predetermined by the detector. Rather by this all achievable image subdivisions are to be understood. In particular the term "image stack" and "image" could be applied also to non-regular coordinate systems. Likewise with regard to the concrete mathematical operations, which are to be employed for use of the data obtained with the inventive device and the inventive process, the person of ordinary skill in the art has a broad spectrum of variation possibilities at hand which can be geared based on the desired experimental proposition.

The invention claimed is:

1. An array for the spectrally resolving detection of a sample (22) by detecting a sample radiation (24) emitted by the sample (22) illuminated by means of an illuminating radiation (12), the array comprising:

a light source e (10, 10'), an illuminating beam path via which illuminating radiation (12) can be delivered from the lighting source (10, 10') to the sample (22), a detector (40), an observation beam path via which sample radiation (24) can be delivered to the detector (40) as observation radiation, an interferometer (30) disposed in a section of the observation beam path which does not comprise the sample (22) such that said interferometer:

splits incident interferometer input radiation into two radiation portions by means of an interferometer beam splitter (32), directs said two radiation portions via two paths which are provided with radiation-guiding means (34, 36) and whose effective path length difference can be modified, and superimposes the two radiation portions in a mutually interfering manner so as to form an interferometer output radiation such that the spectral distribution of the observation radiation impinging at a specific point of the detector (40) can be modified by modifying the effective path length difference, wherein the interferometer (30) is arranged in a beam path section that is common to the illuminating beam path and the observation beam path such that the effective path length difference in the illuminating beam path changes when the effective path length difference is modified in the observation beam path.

2. The array according to claim 1, wherein the apparatus is adapted for detecting a sample (22) contains fluorophores, which by excitation by means of excitation radiation serving as illuminating light (12) are excitable for emission of fluorescence light serving as observation radiation.

3. The array according to according to claim 1, wherein the two paths along which the two radiation portions into which the interferometer (30) splits an incident interferometer input radiation occurring as a parallel ray under travel are, depending upon the adjusted effective path length, (a) identical, (b) overlapping or (c) closely adjacent to each other, and are passed through by the two radiation portions in opposite directions of travel.

4. The array according to according to claim 1, wherein, for changing the effective path length difference, the interferometer (30) is mounted to be pivotable.

5. The array according to according to claim 1, wherein in the observation beam path and in the illuminating beam path image-generating radiation-guiding means (14; 20; 28a; 28b; 34) are provided, so that different points of a spatially limited luminous area in a virtual image field plane (10') of the lighting source (10) are associated with different points of the sample (22), and wherein different points of the sample (22) are associated with different points of the detector (40).

6. The array according to claim 5, wherein the luminous area of the lighting source (10) is arranged offset relative to the axis of symmetry of the illuminating beam path, so that radiation occurring from one point in the luminous area and supplied to the associated point of the sample (22) not as illuminating radiation (12) but rather as radiation (12') back-reflected from the interferometer (30) is radiated in a direction which is different from the respective direction in which observation radiation originating from the associated point of the sample (22) is radiated as interferometer output radiation.

7. A process for the spectrally resolving detection of a sample (22) by detecting a sample radiation (24) emitted by the sample (22) illuminated by means of an illuminating radiation (12), comprising:

delivering illuminating radiation (12) to the sample (22) from a lighting source (10, 10') via an illuminating beam path, and delivering sample radiation (24) to a detector (40) an observation radiation via an observation beam path, wherein observation radiation passes through an interferometer (30) that is disposed in a section of the observation beam path which does not comprise the sample (22), in which the observation radiation is split up, as incident interferometer input radiation, into two radiation portions by means of an interferometer beam splitter (32), said two radiation portions are directed via two paths whose effective path length difference can be modified, and the two radiation portions are superimposed in a mutually interfering manner so as to form an output interferometer radiation wherein, one after another, a plurality of measurement data are recorded at different settings of the effective path length difference such that the spectral distribution of the observation radiation impinging at a specific point of the detector (40) is different for different measurements, wherein illuminating radiation (12) also passes through the same interferometer (30) so that the effective path length difference in the illuminating beam path changes when the effective path length difference in the observation beam path is modified.

8. A process according to claim 7, wherein the sample (22) contains fluorophores, which can be excited by means of excitation light (12) serving as illuminating radiation to emission of fluorescence light serving as observation radiation.

9. The process according to claim 7, further comprising producing, as a process intermediate result, a sequence of intensity measurement units corresponding point wise to each other, wherein each intensity measurement unit represents one measurement result of one of the individual measurements.

10. The process according to claim 7, wherein each intensity measurement unit is a two-dimensional matrix, whose inputs in each case code one intensity measurement for an area in the sample (22) associated to the respective position in the matrix.

11. The process according to claim 7, wherein the sequence of intensity measurement units are compared point wise with stored data characterizing possible components of the sample in order to identify characteristics of actual components of the sample (22) in the corresponding point.

12. The processing according to claim 7, wherein the sequence of intensity measurement units are computationally combined point wise with stored data characterizing possible components of the sample, in order to identify characteristics of actual components of the sample (22) in the corresponding point.

13. The process according to claim 7, wherein the sequence of intensity measurement units are subjected point wise to a spectrum producing mathematic operation, which produces a sequence of spectral data units corresponding point wise to each other.

14. The process according to claim 13, wherein the mathematical operation includes the use of a Fourier transform.

15. The process according to claim 13, wherein the mathematical operation includes a real part calculation and/or an absolute value calculation of a complex spectrum.

16. The process according to claim 13, wherein the sequence of spectral data units is segmented into different spectral data segments on the basis of a priori known information regarding possible spectral distributions of the illuminating radiation and/or the observation radiation.

17. The process according to claim 13, wherein a spectral data unit or a partial sequence of spectral data units from a spectral data segment that is solely attributable to the illuminating radiation is used for representation of the object plane of interest of the sample (22).

18. The process according to claim 13, wherein a first spectral data unit or a partial sequence of first spectral data units from a spectral data segment that is solely attributable to the illuminating radiation is processed with a second spectral data unit or a partial sequence of second spectral data units from a spectral data segment that is solely attributable to the observation radiation to yield a calculated spectral data unit in such a manner that the calculated spectral data unit is used for representation of the object plane of interest of the sample (22).

19. The process according to claim 13, wherein a first spectral data unit or a partial sequence of first spectral data units from a spectral data segment attributable to both the illuminating radiation as well as the observation radiation is computationally combined with a second spectral data unit or a partial sequence of spectral data units from a spectral data segment that is attributable to the observation radiation to yield a calculated spectral data unit in such a way that the calculated spectral data unit is used for representation of the object plane of interest of the sample (22).

20. The process according to claim 13, wherein a partial sequence of spectral data units are compared point wise with stored data characterizing possible components of the sample, in order to identify characteristics of actual components of the sample (22) in the corresponding point.

* * * * *